(12) United States Patent
Markaryan (10) Patent No.: US 10,380,858 B2
(45) Date of Patent: Aug. 13, 2019

(54) METHOD AND MONTORING DEVICE FOR MONITORING A TAG

(71) Applicant: Konstantin Markaryan, London (GB)

(72) Inventor: Konstantin Markaryan, London (GB)

(73) Assignee: Konstantin Markaryan, London (GB)

( * ) Notice: Subject to any disclaimer, the term of this patent is extended or adjusted under 35 U.S.C. 154(b) by 0 days.

(21) Appl. No.: 15/374,260

(22) Filed: Dec. 9, 2016

(65) Prior Publication Data

US 2017/0169681 A1    Jun. 15, 2017

(51) Int. Cl.
| | |
|---|---|
| *G01S 5/06* | (2006.01) |
| *G08B 13/24* | (2006.01) |
| *G06K 7/10* | (2006.01) |
| *H04W 4/02* | (2018.01) |

(52) U.S. Cl.
CPC ..... *G08B 13/2482* (2013.01); *G06K 7/10475* (2013.01); *G08B 13/248* (2013.01); *G08B 13/2462* (2013.01); *H04W 4/027* (2013.01)

(58) Field of Classification Search
CPC ........ G01S 5/02; G06Q 10/08; G08B 13/2417
USPC ...................................... 340/10.1, 8.1, 572.1
See application file for complete search history.

(56) References Cited

U.S. PATENT DOCUMENTS

| | | | | |
|---|---|---|---|---|
| 7,295,114 B1 * | 11/2007 | Drzaic | .................. | A62B 99/00 235/385 |
| 7,557,710 B2 * | 7/2009 | Sanchez | ................ | G06F 19/327 235/385 |
| 2005/0073418 A1 | 4/2005 | Kelliher et al. | | |
| 2006/0045310 A1 | 3/2006 | Tu et al. | | |
| 2007/0103313 A1 * | 5/2007 | Washington | ....... | G06K 7/10079 340/572.8 |
| 2008/0002031 A1 * | 1/2008 | Cana | ..................... | G01S 5/0027 348/208.14 |
| 2008/0143482 A1 * | 6/2008 | Shoarinejad | ............ | G01S 7/003 340/10.1 |
| 2009/0128334 A1 * | 5/2009 | Starr | ................ | G08B 13/19667 340/572.1 |
| 2011/0193958 A1 * | 8/2011 | Martin | ................... | H04N 7/181 348/143 |
| 2012/0044074 A1 * | 2/2012 | Mulla | .................... | G06Q 10/08 340/572.1 |
| 2012/0319818 A1 * | 12/2012 | Unger | .................. | G01S 5/0009 340/8.1 |

(Continued)

FOREIGN PATENT DOCUMENTS

| | | |
|---|---|---|
| GB | 2355876 A | 5/2001 |
| WO | 2004051590 A2 | 6/2004 |

OTHER PUBLICATIONS

Extended European Search Report for European Patent Application No. 16203131.4 dated Apr. 13, 2017, 8 pages.

*Primary Examiner* — Munear T Akki
(74) *Attorney, Agent, or Firm* — Amin, Turocy & Watson, LLP (57) ABSTRACT

A method of determining a revised position of a tag, comprising the steps of determining a first parameter associated with the tag based on a first set of data from a first sensor, determining a second parameter associated with an object based on a second set of data from a second sensor, determining whether the first parameter corresponds to the second parameter, and if the first parameter corresponds to the second parameter, determining the revised position of the tag based on the second set of data.

13 Claims, 3 Drawing Sheets

(56) References Cited

U.S. PATENT DOCUMENTS

| | | | | |
|---|---|---|---|---|
| 2013/0154835 A1* | 6/2013 | Ehrman | ............ | G08B 21/0492 340/568.1 |
| 2014/0035726 A1* | 2/2014 | Schoner | ............ | G06K 7/10366 340/8.1 |
| 2014/0361875 A1* | 12/2014 | O'Hagan | ........... | G06K 7/10227 340/8.1 |
| 2015/0002269 A1* | 1/2015 | Bajema | .................... | G01S 5/02 340/8.1 |
| 2015/0243158 A1* | 8/2015 | Bassan-Eskenazi | ... | G08B 21/24 340/539.32 |
| 2016/0379074 A1* | 12/2016 | Nielsen | ................ | G06K 9/3241 348/143 |

\* cited by examiner

METHOD AND MONTORING DEVICE FOR MONITORING A TAG

FIELD

This disclosure relates to a method and device for monitoring a tag. More particularly, this disclosure discloses embodiments that relate to a method and device for monitoring a tag based on data from sensors such that a revised position of the tag may be determined, for example, within a retail environment.

BACKGROUND

In various situations, it can be desirable to prevent articles from being removed from an area or to detect the movement of articles within an area. For example, it may be desirable to prevent the removal of articles from a shop that have not been paid for i.e. to prevent shoplifting.

One approach is electronic article surveillance (EAS). Methods of EAS rely on specialised tags attached to the articles. Detectors, often placed at the exit of the area, are able to detect the tag and thus the article to which the tag is attached. An alarm may be activated if the detector detects a tag leaving the area. The tags may be detached from the article or deactivated so that the article can be removed from the area without the alarm being activated.

Typically, the tag will include a suitable antenna that generates a field able to be detected by a corresponding antenna or reader in the detector. Alternatively, the tag may detectably interfere with a field being generated by the detector itself. Some known approaches rely on, for example, magnetic, acousto-magnetic or radio frequency fields.

A downside of this approach to EAS is that it can be difficult to determine the position of the tag (and thus the article) with a suitable degree of precision. This makes it difficult to determine if and when the article is being removed from the area.

In some approaches, the detector may be able to scan for tags in multiple directions, and from the angle of the signal determine the approximate position of a tag. For this measurement, it may be necessary to presume the height of the tag off the floor, which may in fact not be accurate. The strength of the signal may be used to approximate further the position of the tag. However, the strength of the signal is dependent on the angle of the tag antenna relative to the detector antenna. For at least these reasons, these approaches may not be sufficiently precise or accurate at determining the position of a tag.

Another approach is to provide gate-like detectors at the exit of an area through which people have to pass. Though these detectors give increased precision, they can be unsightly and are limited to well defined exits (such as, for example, a doorway).

It is therefore desirable to provide a method and device for determining the position of a tag with improved accuracy and/or precision. There is also a need for providing a method and device for determining the position of a tag that is not dependent on obtrusive gate-like detectors.

SUMMARY OF THE INVENTION

According to a first aspect as defined in claim 1, there is provided a method of determining a revised position of a tag, comprising the steps of: (a) determining a first parameter associated with the tag based on a first set of data from a first sensor; (b) determining a second parameter associated with an object based on a second set of data from a second sensor; (c) determining whether the first parameter corresponds to the second parameter; and (d) if the first parameter corresponds to the second parameter, determining the revised position of the tag based on the second set of data.

Optionally, the tag may be a passive or an active RFID tag, RFID label or RFID card. The tag may comprise an antenna. The antenna may be coiled. An active RFID tag may comprise circuitry and a battery. The antenna may form a magnetic field. The tag may be attached to an article being sold in a shop. The tag may be configured to store information regarding the article to which it is attached. The tag may be configured to be put in a deactivated state upon the article being purchased from the shop.

Optionally, the first sensor may be an RFID reader. The RFID reader may comprise an antenna. The RFID reader may comprise circuitry to process data. Data may be sent to other devices in one or more of different protocols. The RFID reader's antenna may emit radio waves. A tag may respond by sending back data. Optionally, the first set of data may comprise the angle of the RFID tag relative to the RFID reader. The first set of data may comprise signal strength of a signal sensed by the RFID reader.

Optionally, the first parameter comprises a tag position, being indicative of a position of the tag.

Optionally, the step of determining the first parameter associated with the tag includes determining the tag position.

Optionally, the first parameter comprises a tag velocity, being indicative of a velocity of the tag.

Optionally, the step of determining the first parameter associated with the tag includes determining the tag velocity. This may comprise determining the tag position of the tag and, after a first time interval, determining a further tag position based on a further first set of data from the first sensor, and using the change in position of the tag from the tag position to the further tag position over the first time interval to determine the tag velocity.

Optionally, the first sensor may be a magnetic or inductive reader. The first sensor may read magnetic or inductive waves from a tag.

Optionally, the first sensor may be an optical reader. An optical RFID tag may operate in the electromagnetic spectrum between the frequencies of 333 and 750 THz.

A tag may send and/or receive signals.

Optionally, the first sensor may be a BLE reader (bluetooth low energy, iBeacon) for reading BLE tags.

Optionally, the object may be a person.

Optionally, the second sensor may be a people counter. The second sensor may be a thermal counter. The second sensor may be an infra-red counter. The second sensor may be a camera. The camera may capture at least one image of a region, wherein the object is within the region. The second sensor may be a 3D video camera. The 3D video camera may capture video of a region, wherein the object is within the region. The second sensor may be a 3D video counter or other counting device, optionally with 3D capability.

Optionally, the second sensor may be a counter based on Wifi. The second sensor may collect WiFi probe request signals from smartphones or other WiFi devices. The second sensor may comprise a combination of video and WiFi counting.

Optionally, the second sensor may be a counter based on metal detection.

Optionally, the second parameter comprises a first object position, being indicative of a position of the object.

Optionally, the step of determining the second parameter associated with the object includes determining the first object position.

Optionally, the second parameter comprises an object velocity, being indicative of a velocity of the object.

Optionally, the step of determining the second parameter associated with the object includes determining the object velocity. This may comprise determining the first object position and, after a first time interval, determining a second object position based on a further second set of data from the second sensor, and using the change in position of the object from the first object position to the second object position over the first time interval to determine the object velocity.

Optionally, the step of determining whether the first parameter corresponds to the second parameter may comprise determining whether the tag position corresponds to the object position. The tag position may comprise a range of tag position values. The range of tag position values may be defined by a sensed tag position value and a tag position uncertainty value. The object position may comprise a range of object position values. The range of object position values may be defined by a sensed object position value and an object position uncertainty value. The step of determining whether the tag position corresponds to the object position may comprise determining whether the range of tag position values, at least partially, coincides with the range of object position values. This may comprise determining whether the sensed tag position value is within the range of object position values or determining whether the sensed object position value is within the range of tag position values.

Optionally, the first parameter may further comprise the tag velocity and preferably a direction of tag velocity. The second parameter may further comprise the object velocity and preferably a direction of object velocity. The step of determining whether the first parameter corresponds to the second parameter may further comprise determining whether the tag velocity and/or direction of tag velocity corresponds to the object velocity and/or direction of object velocity. The tag velocity may comprise a range of tag velocity values. The range of tag velocity values may be defined by a determined tag velocity value and a tag velocity uncertainty value. The object velocity may comprise a range of object velocity values. The range of object velocity values may be defined by a determined object velocity value and an object velocity uncertainty value. The step of determining whether the tag velocity corresponds to the object velocity may comprise determining whether the range of tag velocity values, at least partially, coincides with the range of object velocity values. This may comprise determining whether the determined tag velocity value is within the range of the object velocity values or determining whether the determined object velocity value is within the range of tag velocity values.

Optionally, the second set of data may be more precise than the first set of data. The object position uncertainty value may be smaller than the tag position uncertainty value. The object velocity uncertainty value may be smaller than the tag velocity uncertainty value.

Optionally, the method may include the further step of determining whether the revised position of the tag is at least one of: outside a first defined zone and inside a second defined zone. The first defined zone may be defined by the boundary of a shop or the boundary of a zone within the shop. The second defined zone may be defined by the boundary of a shop or the boundary of a zone within the shop. The method may include the further step of, if the revised position of the tag is at least one of outside the first defined zone and inside the second defined zone, activating an alarm. The method may include the further step of determining whether the tag is in the deactivated state. The method may include the further step of, if the tag is not in the deactivated state and if the revised position of the tag is at least one of outside the first defined zone and inside the second defined zone, activating the alarm. Activating the alarm may comprise providing a signal indicative of an alarm state.

Optionally, the method may include the further step of determining a further revised position of the tag by repeating steps (a) to (d) at a predetermined time interval after step (d).

Optionally, the first sensor and second sensor may be housed within a single housing. Optionally, there may be a plurality of units each comprising a housing, each unit housing at least one of: one of a plurality of first sensors and one of a plurality of second sensors. Optionally, the step of determining the first parameter may comprise determining the first parameter based on the first set of data from the first sensor and from a further first set of data from a further first sensor. Optionally, the step of determining the second parameter may comprise determining the second parameter based on the second set of data from the second sensor and from a further second set of data from a further second sensor.

According to a second aspect as defined in claim 12, there is provided a monitoring device for determining a revised position of a tag, wherein the monitoring device comprises a first sensor configured to sense a first set of data, a second sensor configured to sense a second set of data, and a processor, wherein the processor is configured to: determine a first parameter associated with the tag based on the first set of data; determine a second parameter associated with an object based on the second set of data; determine whether the first parameter corresponds to the second parameter; and if the first parameter corresponds to the second parameter, determine the revised position of the tag based on the second set of data.

Optionally, the tag may be a passive or active RFID tag, RFID label or RFID card. The tag may comprise an antenna. The antenna may be coiled. An active RFID tag may comprise circuitry and a battery. The antenna may form a magnetic field. The tag may be attached to an article being sold in a shop. The tag may be configured to store information regarding the article to which it is attached. The tag may be configured to be put in a deactivated state upon the article being purchased from the shop.

Optionally, the first sensor may be an RFID reader. The RFID reader may comprise an antenna. The RFID reader may comprise circuitry to process data. Data may be sent to other devices in one or more of different protocols. The RFID reader's antenna may emit radio waves. A tag may respond by sending back data. Optionally, the first set of data may comprise the angle of the RFID tag relative to the RFID reader. The first set of data may comprise signal strength of a signal sensed by the RFID reader.

Optionally, the first parameter comprises a tag position, being indicative of a position of the tag.

Optionally, the processor is configured to determine the first parameter associated with the tag by determining the tag position.

Optionally, the first parameter comprises a tag velocity, being indicative of a velocity of the tag.

Optionally, the processor is configured to determine the first parameter associated with the tag by determining the tag velocity. This may comprise determining the tag position of the tag and, after a first time interval, determining a further tag position based on a further first set of data from the first sensor, and using the change in position of the tag from the tag position to the further tag position over the first time interval to determine the tag velocity.

Optionally, the first sensor may be a magnetic or inductive reader. The first sensor may read magnetic or inductive waves from a tag.

Optionally, the first sensor may be an optical reader. An optical RFID tag may operate in the electromagnetic spectrum between the frequencies of 333 and 750 THz.

A tag may send and/or receive signals.

Optionally, the first sensor may be a BLE reader (bluetooth low energy, iBeacon) for reading BLE tags.

Optionally, the object may be a person.

Optionally, the second sensor may be a people counter. The second sensor may be a thermal counter. The second sensor may be an infra-red counter. The second sensor may be a camera. The camera may capture at least one image of a region, wherein the object is within the region. The second sensor may be a 3D video camera. The 3D video camera may capture video of a region, wherein the object is within the region. The second sensor may be a 3D video counter or other counting device, optionally with 3D capability.

Optionally, the second sensor may be a counter based on Wifi. The second sensor may collect WiFi probe request signals from smartphones or other WiFi devices. The second sensor may comprise a combination of video and WiFi counting.

Optionally, the second sensor may be a counter based on metal detection.

Optionally, the second parameter comprises a first object position, being indicative of a position of the object.

Optionally, the processor is configured to determine the second parameter associated with the object by determining the first object position.

Optionally, the second parameter comprises an object velocity, being indicative of a velocity of the object.

Optionally, the processor is configured to determine the second parameter associated with the object by determining the object velocity. This may comprise determining the first object position and, after a first time interval, determining a second object position based on a further second set of data from the second sensor, and using the change in position of the object from the first object position to the second object position over the first time interval to determine the object velocity.

Optionally the processor may comprise at least one of: a single board computer, an embedded system, a central processing unit, a programmable logic controller, a system on a chip, a microcontroller, a microprocessor, an integrated circuit, an FPGA, a PLD, or other programmable device.

Optionally, the processor may determine the first parameter based on the first set of data and a further first set of data provided from a further monitoring device. Optionally, the processor may determine the second parameter based on the second set of data and a further second set of data provided from a further monitoring device.

Optionally, the processor may determine whether the first parameter corresponds to the second parameter by determining whether the tag position corresponds to the object position. The tag position may comprise a range of tag position values. The range of tag position values may be defined by a sensed tag position value and a tag position uncertainty value. The object position may comprise a range of object position values. The range of object position values may be defined by a sensed object position value and an object position uncertainty value. The processor may determine whether the tag position corresponds to the object position by determining whether the range of tag position values, at least partially, coincides with the range of object position values. This may comprise determining whether the sensed tag position value is within the range of object position values or determining whether the sensed object position value is within the range of tag position values.

Optionally, the first parameter may further comprise a first velocity of the tag. The second parameter may further comprise a second velocity of the object. The processor may determine whether the first parameter corresponds to the second parameter by determining whether the first velocity corresponds to the second velocity. The first velocity may comprise a range of first velocity values. The range of first velocity values may be defined by a determined first velocity value and a first velocity uncertainty value. The second velocity may comprise a range of second velocity values. The range of second velocity values may be defined by a determined second velocity value and a second velocity uncertainty value. The processor may determine whether the first velocity corresponds to the second velocity by determining whether the range of first velocity values, at least partially, coincides with the range of second velocity values. This may comprise determining whether the determined first velocity value is within the range of the second velocity values or determining whether the determined second velocity value is within the range of first velocity values.

Optionally, the second set of data may be more precise than the first set of data. The object position uncertainty value may be smaller than the tag position uncertainty value. The second velocity uncertainty value may be smaller than the first velocity uncertainty value.

Optionally, the processor may further determine whether the revised position of the tag is at least one of: outside a first defined zone and inside a second defined zone. The first defined zone may be defined by the boundary of a shop or the boundary of a zone within the shop. The second defined zone may be defined by the boundary of a shop or the boundary of a zone within the shop. The processor may be further configured to activate an alarm if the revised position of the tag is at least one of outside the first defined zone and inside the second defined zone. The processor may determine whether the tag is in the deactivated state. The processor may be further configured to activate an alarm if the tag is not in the deactivated state and if the revised position of the tag is at least one of outside the first defined zone and inside the second defined zone.

Optionally, the processor may be configured to count the number of people entering or leaving the defined zone.

Optionally, the monitoring device may include a memory. The memory may be a solid-state drive or a hard disk drive. The memory may store data sensed by the first sensor and the second sensor.

Optionally, the monitoring device may be connected to a remote and/or cloud server. Optionally, the monitoring device may store data or a copy of data on a remote and/or cloud server.

Optionally, the processor may be configured to prepare a report based on the data sensed by the first sensor and the second sensor. The report may contain information regarding the movement of tags, the movement of goods, the number or frequency of people entering or leaving the shop or a zone within the shop. The report may contain information based on data sensed by the first sensor and the second sensor over a predetermined time period. The report may be transmitted to the mobile device of an authorised person.

Optionally, the monitoring device may be configured to connect to a network. Optionally, the monitoring device may be configured to communicate with other monitoring devices over the network or directly. The monitoring device may connect to the network using a wired or wireless connection. The monitoring device may include a communication module. The communication module may comprise at least one of: Wi-Fi, Ethernet and Bluetooth. The network may comprise at least one of: a local-area network, a wide-area network and an ad-hoc network. Optionally, the monitoring device may be configured to communicate with a point of sale terminal over the network or directly. Optionally, the monitoring device may be configured to communicate with a mobile device over the network or directly. Optionally, the monitoring device may be configured to communicate with a remote server over the network.

Optionally, the monitoring device may be configured to determine the position of the mobile device. The monitoring device may be configured to transmit information to the mobile device. The monitoring device may transmit data using the communication module. The transmitted information may be dependent on the determined position of the mobile device.

Optionally, the monitoring device may include an alarm. The alarm may comprise at least one of: a light emitting component and a noise emitting component.

Optionally, the monitoring device may be a single unit, comprising a single housing. The monitoring device may include shielding to prevent interference between components of the monitoring device including: the first sensor; the second sensor; the communication module; and the processor.

Optionally, the monitoring device may be configured to be mounted to a ceiling.

According to a third aspect as defined in claim 15, there is providing a system comprising a plurality of monitoring devices according to the second aspect and/or any embodiments described herein.

The system may include the same optional features as described in relation to the second aspect.

According to an example, there is provided a computer-readable media comprising instructions executable by a processor to cause the monitoring device to carry out a method according to any of the above methods and/or embodiments described herein. A monitoring device according to any of the embodiments described herein may comprise the processor.

Reference to any prior art in this specification does not constitute an admission that such prior art forms part of the common general knowledge.

BRIEF DESCRIPTION OF THE DRAWINGS

Specific embodiments will now be described by way of example only and with reference to the accompanying drawings, in which.

DETAILED DESCRIPTION

Figure 1:
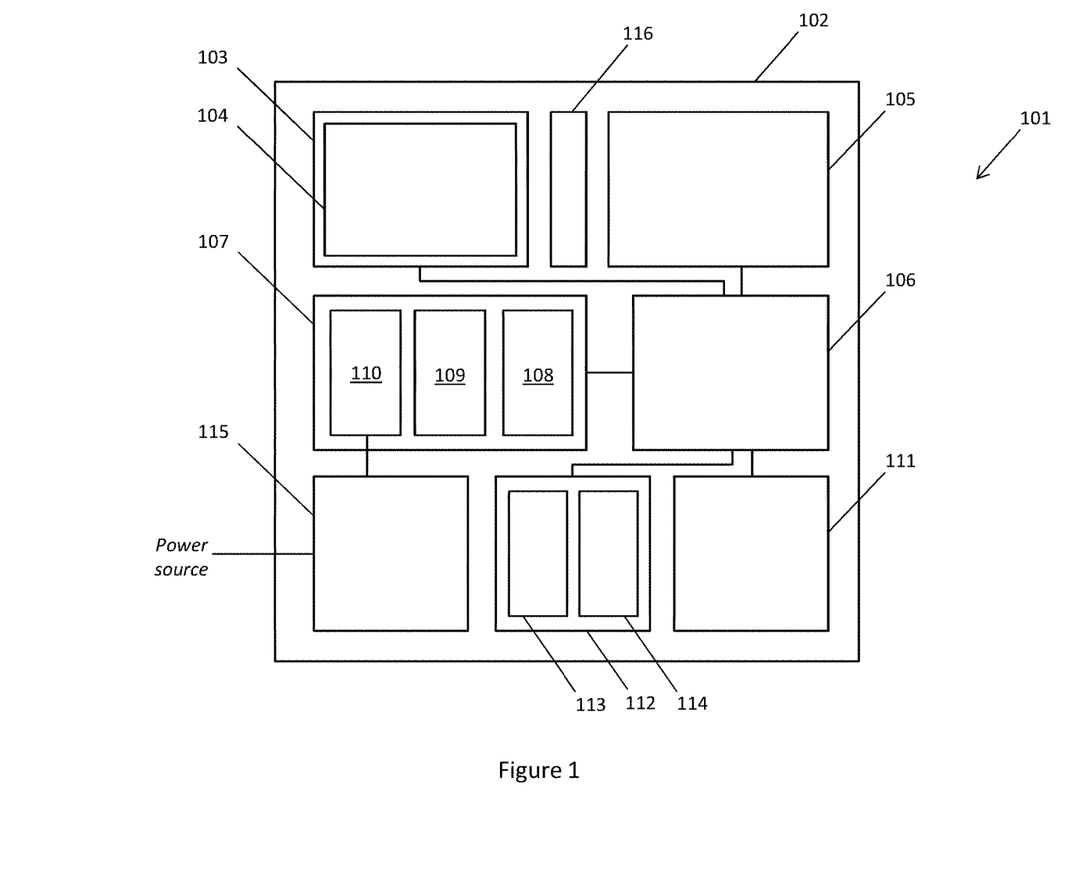
FIG. 1 shows a block diagram representing a monitoring device.

Before describing the method of the present disclosure, it is helpful to first give an overview of the monitoring device and system used in relation to the method. Referring to FIG. 1, there is shown a block diagram representing a monitoring device 101 for determining a revised position of a tag (not shown). The monitoring device may comprise a single unit. The monitoring device 101 comprises a single housing 102 in which various components are contained.

The monitoring device 101 includes a first sensor 103 configured to sense a first set of data. The first sensor may be an RFID reader 103. The RFID reader 103 may include an antenna 104, the antenna 104 may be a discrete antenna, but positioned inside the housing of the monitoring device. The antenna may be a two patch-antenna with dual linear polarisation or a circular polarisation mono antenna or any other RFID antenna system. As will be appreciated the particular configuration of RFID reader and RFID tag will depend on the type of RFID system being used. For example, the RFID system may rely on passive or active RFID tags, or may be limited to a particular frequency band, such as UHF, and may rely on a particular signalling/detection protocol. Further, the RFID reader may be connected to an ancillary antenna (not shown) positioned externally from the housing of the monitoring device.

The monitoring device 101 includes a second sensor 105 configured to sense a second set of data. The second sensor may be a people counter, such as a thermal counter, infra-red beam counter or a video camera. The second sensor 105 may be a stereoscopic 3D video camera people counter, 3D video counter or other counting device, optionally with 3D optical capability. The second set of data may comprise video data. The stereoscopic 3D camera may comprise a double optical system and circuitry for processing and analyzing video data. The camera may also capture 3D images of the area below the device and analyze the height, shape, velocity and/or direction of any objects that are passing through the field of view.

References to a 3d video camera in this specification may be replaced with 3D video counter as would be understood.

The monitoring device 101 includes a processor 106. In this embodiment, the processor is a single board computer, though it will be appreciated that other types of processors may be used. The first sensor 103 and second sensor 105 are connected to the processor 106 such that the first set of data and the second set of data may be provided to the processor 106.

Though the processor 106 is shown in FIG. 1 as a single component, it will be appreciated that the processor 106 may also be configured as a combination of separate components. It will also be appreciated that, in some embodiments, at least some of the functions of the processor 106 may be carried out by processors embedded in the other components. For example, the RFID reader may itself include an embedded processor. However, for the sake of simplicity, for the remainder of this description the processor will be referred to as a single component distinct from the other components of the monitoring device 101 and this will be taken to encompass processors that may, in some embodiments, be embedded in other components.

The monitoring device 101 may include a communication module 107. The communication module 107 comprises communication sub-modules, including, for example, a Wi-Fi sub-module 108, a Bluetooth sub-module 109 and/or an Ethernet sub-module 110. The Ethernet sub-module 110 may comprise Power over Ethernet capability. It will be appreciated that sub-modules for other types of communication protocols may, alternatively or additionally, be included. The communication module 107 is connected to the processor 106 such that data received by the communication module (i.e. by the sub-modules) can be passed to the processor and such that the processor can pass data to the communication module to be transmitted to another device (i.e. using a sub-module).

The monitoring device 101 may include a memory 111 connected to the processor 106. The memory may be, for example, a solid-state drive or a hard disk drive.

The monitoring device 101 may include an alarm 112. The alarm 112 may include a light-emitting component 113, such as an LED, and/or a noise-emitting component 114, such as a speaker, siren or a buzzer. The alarm 112 is connected to the processor 106.

The monitoring device 101 may include a power supply 115. The power supply 115 may be connected to an external power source. The external power source may be, for example, AC mains power, DC power or power over Ethernet (PoE).

The monitoring device 101 may also include shielding 116 disposed between the various components of the monitoring device 101. The shielding minimises interference from neighbouring components within the monitoring device. As will be appreciated, the particular arrangement of shielding will depend on the geometry of the monitoring device and the particular fields produced by the various components within the monitoring device. By way of example, FIG. 1 shows shielding 116 between the first sensor 103 and second sensor 105. The shielding 116 may comprise a metal plate between components, or a metal box placed over one or more components on a printed circuit board, or may comprise a metal-coating added to the inside of a plastic cover.

Figure 2:
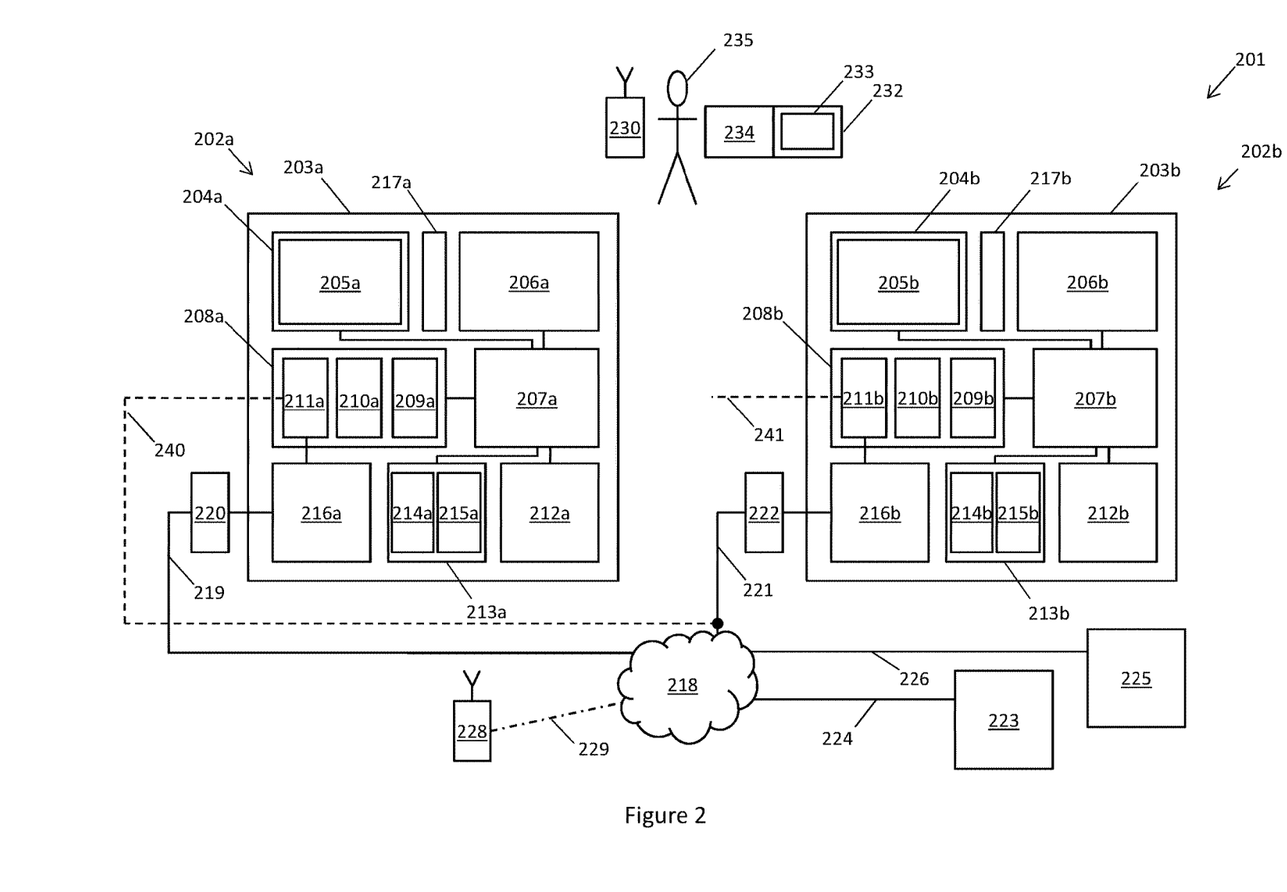
FIG. 2 shows a block diagram representing a system comprising a plurality of monitoring devices.

Referring to FIG. 2, there is shown a system 201 of monitoring devices according to one embodiment. The system 201 includes a plurality of monitoring devices. Though it will be appreciated that the system may be extended to any number of monitoring devices, FIG. 2 shows a system with two monitoring devices: a first monitoring device 202a; and a second monitoring device 202b. Each monitoring device is as described with reference to the monitoring device 101 of FIG. 1. The first monitoring device 202a includes: a housing 203a, a first sensor 204a with an antenna 205a; a second sensor 206a; a processor 207a; a communication module 208a including a Wi-Fi sub-module 209a, a Bluetooth sub-module 210a and an Ethernet sub-module 211a; memory 212a; an alarm 213a including a light-emitting component 214a and a noise-emitting component 215a; a power supply 116a; and shielding 217a. The second monitoring device 202b includes: a housing 203b, a first sensor 204b with an antenna 205b; a second sensor 206b; a processor 207b; a communication module 208b including a Wi-Fi sub-module 209b, a Bluetooth sub-module 210b and an Ethernet sub-module 211b; memory 212b; an alarm 213b including a light-emitting component 214b and a noise-emitting component 215b; a power supply 116b; and shielding 217b.

Though the monitoring devices 202a 202b shown in the system 201 of FIG. 2 are essentially the same, in some embodiments at least some of the monitoring devices may be different. For example, one monitoring device may be similar to the monitoring device 101 described with reference to FIG. 1, and another monitoring device may be a modified version of the monitoring device 101 of FIG. 1. For example, the modified monitoring device may have been modified so as to omit one of the first or second sensors or some other component.

The first monitoring device 202a may be connected to the second monitoring device 202b over a local area network 218. In this embodiment, the first monitoring device 202a is connected to the local area network 218 over an Ethernet connection 219. The Ethernet connection 219 includes a PoE injector 220 for injecting power into the Ethernet connection. The Ethernet connection is then suitably connected to the power supply 216a (from which power can be extracted for use by the monitoring device) and the Ethernet sub-module 211a.

Similarly, the second monitoring device 202b is connected to the local area network 218 over an Ethernet connection 221. The Ethernet connection 221 includes a PoE injector 222 for injecting power into the Ethernet sub-module 211b of the second monitoring device 202b. The Ethernet connection is then suitably connected to the power supply 216b and the Ethernet sub-module 211b.

Alternatively, the second monitoring device 202b may be connected to the Ethernet sub-module 211a from the first monitoring device 202a in a serial manner (as shown by the dashed line 240). A third monitoring device may then be connected to the Ethernet sub-module 211b (as shown by the dashed line 241 in FIG. 2).

Optionally, the PoE injector 220 can power up two or more monitoring devices.

Optionally, the Ethernet connections 219 and 221 can be directly connected to the Ethernet sub-modules 211a and 211b, where an additional power supply (not shown) will be connected directly to the power supply 216a. Such external power supply could power one or more monitoring devices.

The local area network (represented in FIG. 2 as a cloud) may be established at a router (not shown) or across a plurality of routers (not shown).

The system 201 may further include point of sale terminals 223. The point of sale terminals may be connected to the local area network 218 using an Ethernet connection 224.

The system 201 may further include a server 225. The server may be connected to the local area network 218 using an Ethernet connection 226. Alternatively, the server may be a remote server accessible over the internet.

The monitoring devices 202a 202b may be configured to communicate with a mobile device 230 of a customer 235 in the shop using at least one of the Wi-Fi sub-modules 209a 209b and Bluetooth sub-modules 210a 210b.

The system 201 also includes a tag 232. The tag 232 is configured to work with the particular configuration of the first sensors 204a 204b. For example, where the first sensors 204a 204b are RFID readers, the tag 232 may be an RFID tag including a suitable antenna 233. The RFID tag may be attached to an article 234.

Having given an overview of the monitoring device and system, it is helpful to now describe various modes of operation. Though the operation will be described in relation to the system of FIG. 2, it will be appreciated how it may be applied to the monitoring device of FIG. 1 and/or other embodiments of the system. Though this discussion will focus on one monitoring device 202a of the system 201 of FIG. 2, it will be understood that, where applicable, the discussion may be similarly applied to the other monitoring device 202b.

The monitoring device 202a may be configured to be installed in an area to monitor the position of tag(s) 232 within the area. The area may be, for example, a shop, a warehouse or a library. The housing 203a may be configured to enable the monitoring device to be mounted in the shop, and in a particular embodiment, to a ceiling of the shop.

The monitoring devices 202a 202b may be installed so that the region covered by the first monitoring device (i.e. the region of the first and second sensor 204a 206a) and the region covered by the second monitoring device (i.e. the region of the first and second sensor 204b 206b) at least partially overlap or are immediately adjacent. For example, the monitoring devices 202a 202b may be installed so that they both monitor the entrance to the shop. Alternatively (or in addition, if there are more than two monitoring devices), the monitoring devices may be installed so that the regions covered by the first monitoring device is distinct from the second monitoring device. For example, one monitoring device may be installed to monitor the entrance to the shop and another monitoring device may be installed to monitor a changing room zone of the shop. It will be appreciated that the antenna, ancillary antenna and camera of each monitoring device may need to be arranged to ensure the monitoring device covers the desired region.

One monitoring device may be configured to coordinate and/or control other monitoring devices in the system or part of the system. For example, the processor 207a of the first monitoring device 202a may coordinate and/or control the operation of the second monitoring device 202b. Processor 207a may assign tasks to processor 207b. Processor 207a may also perform operations based on data provided from the first sensor 205a and the second sensor 206a of the first monitoring device 202a, but also based on data provided from the first sensor 205b and the second sensor 206b of the second monitoring device 202b. Processor 207b may be configured to relay data from the components of the second monitoring device 202b to the processor 207a of the first monitoring device 202a. Alternatively, or additionally, the processors of each monitoring device may operate together to increase performance.

The tag 232 may be attached to article 234. For example, the article may be an article being sold in the shop. The remainder of the description of the operation the system will be in the context of a shop with articles being sold. However, it will be appreciated that the system may be applied to other types of areas and articles (for example, a library with books available for loan or a warehouse with goods). The article may be stored or displayed in the shop, or the article may be in the possession of a customer 235. For example, the customer may be taking the article out of the shop. The tag 232 may include information about the article 234 to which it is attached. The information stored on the tag may identify the article using a suitable serial number or the information stored on the tag may indicate whether the article has been purchased. Upon the article 234 being purchased, the tag 232 may be put in a deactivated state. The point of sale terminal 223 may be configured to update the information on the tag 232 so as to indicate that the tag is in the deactivated state (and therefore that the article has been purchased). Alternatively, the point of sale terminal 223 may update information stored on the server 225 or monitoring device 202a to indicate that the tag is in the deactivated state.

The monitoring device 202a is configured to monitor the region that it covers. As will be appreciated, the region covered by the first sensor may not be precisely the same as the region covered by the second sensor. For example, an RFID reader may be able to detect RFID tags in any direction within a certain range, whereas the 3D camera may only be able to capture data within the angle of the lens of the camera. Thus, the region covered by the monitoring device may be understood to mean the region of either of the first or second sensor, or region defined by the intersection of the regions of both sensors.

The first sensor 204a may be configured to periodically scan the region it covers. Upon detecting a suitable tag, the first sensor 204a may provide data to the processor 207a in respect of the tag. This may include data corresponding to the position of the tag and data corresponding to information stored on the tag. Where the first sensor 204a is an RFID reader, it may be configured to monitor the surrounding region for corresponding RFID tags. It will be appreciated that the region covered by the RFID reader will depend on the type of RFID system and the configuration of the antenna 205a (and ancillary antenna, when included). The monitoring device 204a may be installed in the shop in a location and/or the RFID reader may be configured such that the region covered by the RFID reader includes a zone where the position of tags may need to be monitored. For example, the monitoring device 204a may be mounted on the ceiling sufficiently near an entrance to the shop such that the region covered by the RFID reader encompasses the entrance to the shop.

In particular, the first sensor 204a is configured to sense a first set of data. The first set of data may include data corresponding to the position of the RFID tag 232. For example, the antenna 205a may be configured to scan in different directions and therefore the first set of data may include data corresponding to the inclination and/or azimuth of the RFID tag with respect to the RFID reader 204a. The first set of data may include data in respect of the strength of the signal from the RFID tag (from which the radius of the RFID tag relative to the RFID reader can be determined).

The RFID reader 204a may also be configured to read information stored on the RFID tag 232. As discussed above, the RFID tag may contain information in respect of the tag itself or the article to which it is attached. Again, it will be appreciated that the manner in which this information is stored on the RFID tag and read by the RFID reader will depend on the type of RFID system being used.

As will be appreciated, in any particular region, there may be more than one RFID tag able to be read by the RFID reader. Therefore, the RFID reader may optionally identify each tag uniquely so as to prevent the RFID reader from confusing two or more tags. For example, each tag may include unique identification able to be read by the RFID reader, or the RFID may distinguish RFID tags based on their position.

Similarly, the second sensor 206a may be configured to periodically scan the region it covers. In the case of the second sensor being a 3D video camera, the second sensor 206a may continually capture video data and provide this video data to the processor 207a. In this case, the second set of data may correspond to the video data captured by the 3D video camera. The 3D video camera 206a may capture video of a watched region within the shop. For example, the 3D camera may be set to capture video footage of the entrance to the shop. The 3D video camera 206a of the monitoring device 202a may be configured such that the region covered by the 3D video camera at least partially overlaps with the region covered by the RFID reader 204a.

The second set of data may include data corresponding to the position of an object in the shop or in the watched region of the shop. For example, the object may be a person in the shop or a person passing through the entrance to the shop. In other embodiments, the object may be something other than a person, for example, a shopping trolley. However, for the sake of simplicity, the remainder of this description will proceed on the basis that the object is a person.

As will be described in more detail below, the processor 207a may use the data from the first sensor 204a and second sensor 206a to determine a first parameter, a second parameter and a revised position of a tag. In particular, the processor may use the revised position to determine when a tag (and the article to which it is attached) has moved outside a first defined zone and/or inside a second defined zone. The first defined zone and second defined zone may be defined by an authorised user. For example, the authorised user may define the first zone as the entire area within the boundary of the shop and the second zone as being the changing room area within the shop. The defined zones may be defined so that they do not intersect. However, they may also be defined so that they do intersect (as with the previous example).

As will be described in more detail below, the processor 207*a* is configured to determine a first parameter associated with the tag 232 based on the first set of data. The first parameter may comprise a tag position, being indicative of a position of the tag. For example, the processor 207*a* may be configured to use the first set of data from the RFID reader 204*a* to determine at least one of the inclination, azimuth and radius of the RFID tag relative to the RFID reader. (It will be appreciated that other coordinate systems may be used, and spherical coordinates have been used here by way of example.) Since the position of the monitoring device 202*a* in the shop is known, the tag position of the RFID tag within the shop can be determined.

The first parameter may alternatively, or additionally, comprise a tag velocity and/or direction of tag velocity of the tag. The processor may determine the tag position as described above. Then after a certain time interval, the processor may similarly determine a further tag position based on a further set of data from the RFID reader. The processor may then use the change in position of the tag from the tag position to the further tag position over the time interval to determine the tag velocity.

The processor 207*a* is also configured to determine a second parameter associated with the person 235 based on the second set of data. The second parameter may comprise an object position, being indicative of a position of the person.

The processor 207*a* may be configured to use the second set of data from the second sensor 206*a*. The second sensor 206*a*, in case of being a stereo 3D video camera, may be configured to process this video data to identify objects within the images captured by the 3D video camera.

For example, using suitable video analysis techniques, the second sensor 206*a* may be able to recognise and isolate a person within a video image. Further, the second sensor 206*a* may be able to determine the position of the person relative to the 3D video camera or the velocity of the person, based on an overlay grid of coordinates and thus comparing the image of the object to the grid and calculating the actual position, velocity and direction of the object or person. The second sensor 206*a* may send only these events, positions, velocity and direction information to the processor 207*a*.

The second parameter may alternatively, or additionally, comprise an object velocity. The processor may determine the object position as described above. Then after a certain time interval, the processor may similarly determine a further object position based on a further set of data from the 3D video camera. The processor may then use the change in position of the object from the object position to the further object position over the time interval to determine the object velocity.

The processor is further configured to determine whether the first parameter corresponds to the second parameter; and if the first parameter corresponds to the second parameter, determine the revised position of the tag based on the second set of data. The processor is accordingly configured to carry out the steps of the method, as will be described in more detail below.

The processor 207*a* 207*b* may be programmed with a computer program comprising code portions configured so that the processor carries out the operations described herein.

Further, the processor 207*a* may use the data provided from various part of the system to prepare reports. The processor may access data stored on the memory of the monitoring device and/or on the server. The reports may be prepared automatically or in response to a request from an authorised user. The reports may be stored on the memory of the monitoring device or the server. The reports may be accessed by an authorised user, for example using a mobile device connected to system (as described in relation to FIG. 2). Alternatively, or in addition, the processor may send the reports to authorised users using email. The authorised user may use information in the reports to make decisions about the running of the shop. The reports may include at least some of the following information:

Intensity of incoming and outgoing customer streams
Concentrations of customers in certain regions or zones in the shop
Total customer count for a given time period (e.g. hour, day, month or year)
Percentage of customers that purchase articles
Amount of staff in the shop at a given time
Time periods of high customer count
Time periods of low customer count
Time periods of high purchase count
Time periods of low purchase count
Predictions of customer behaviour for future time periods
Number of articles purchased for a given time period (e.g. hour, day, month or year)
Inventory information
Video footage The communication module 208*a* is configured so that the monitoring device 202*a* is able to communicate with other devices. The other devices may include, for example, other monitoring devices, mobile devices, servers and point of sale terminals. The communication module 208*a* may communicate with the other devices over a network 218 or directly. It will further be appreciated that the sub-module used will depend on the type of device being communicated with and how the particular device is connected to the monitoring device. Thus, by way of example, the monitoring device may communicate with another monitoring device directly using the Ethernet sub-module and the monitoring device may communicate with a server over the internet using the Wi-Fi sub-module.

The Wi-Fi sub-module 209*a* and Bluetooth sub-module 210*a* may be able to detect the presence of a customer's mobile device 230 in the region of the monitoring device 202*a*. The monitoring device may use the Wi-Fi sub-module 209*a* or the Bluetooth sub-module 210*a* to push messages to the customer's mobile device, for example regarding discounts or loyalty programmes. The Wi-Fi sub-module 209*a* and Bluetooth sub-module 210*a* may track the movement of a mobile device 230 in the region of the monitoring device 202*a*. The processor 207*a* may use data from the Wi-Fi sub-module 209*a* and Bluetooth sub-module 210*a* to determine how long and how often a mobile device 230 has been in the shop. Customers may be able to use their mobile device to register with membership programmes or similar provided by the shop.

The memory 212*a* stores data used by the processor 207*a*. For example, the memory may store data sensed by the first sensor 204*a* and second sensor 206*a*. The memory 212*a* may further store data in respect of the other aspects of the system. For example, the memory 212a may include a record of tags and whether they are in a deactivated state (and therefore whether the articles to which they are attached have been purchased). This data may be updated in response to instructions received from other devices. For example, upon an article being purchased a point of sale terminal 223 may instruct the processor 207a to update the data on the memory 212a to indicate that the tag is in a deactivated state. The processor 212a may also use the data stored on the memory to prepare reports. Since each monitoring device 202a 202b contains a memory 212a 212b, each memory may replicate data stored on other memories and thus together the memories may operate as a redundant array of independent disks (RAID) to provide data redundancy and improve performance.

The alarm 213a is connected to the processor 207a, such that upon identifying an alarm state, the processor may cause the alarm to produce an alarm, for example, by activating the LED 214a and/or activating the speaker, siren or buzzer 215a. The processor may identify an alarm state in response to determining that the tag is outside or inside a particular zone.

As described above, the point of sale terminals 223 may provide data to the monitoring device 202a in respect of articles that have been sold and tags that are in a deactivated state. The point of sale terminals 223 may also be configured to update information on the tag itself when a purchase is made to indicate that the tag is in a deactivated state. For example, the point of sale terminals 223 may include an RFID reader. The point of sale terminals may also be used to update information on the tags even when a purchase has not been made—for example, when a tag is initially being attached to an article, an article is being added to the inventory or a stocktake is being undertaken. Data may be provided from the point of sale terminals 223 to the monitoring devices 202a 202b or the server 225. This data may include information regarding articles (and their attached tags) that have been purchased. Upon purchase, the point of sale terminal may update the data on the monitoring devices or the server to indicate that the tag is in a deactivated state. As will be described in more detail later, this information may then be used by a processor to determine whether to activate an alarm.

The server 225 may receive and store information from other parts of the system 201. Accordingly, other parts of the system 201 may be able to access information on the server. The server 225 may provide a backup of data from other parts of the system 201, including data stored on the monitoring devices 202a 202b. Further, the server 225 may provide an interface for an authorised user (such as, for example, an authorised member of staff) to control the operation of the system and the monitoring devices 202a 202b. The authorised member may access the server over the local area network 218 using a mobile device 228. For example, the mobile device may be a smartphone and may connect to the local area network over a Wi-Fi connection 229.

Figure 3:
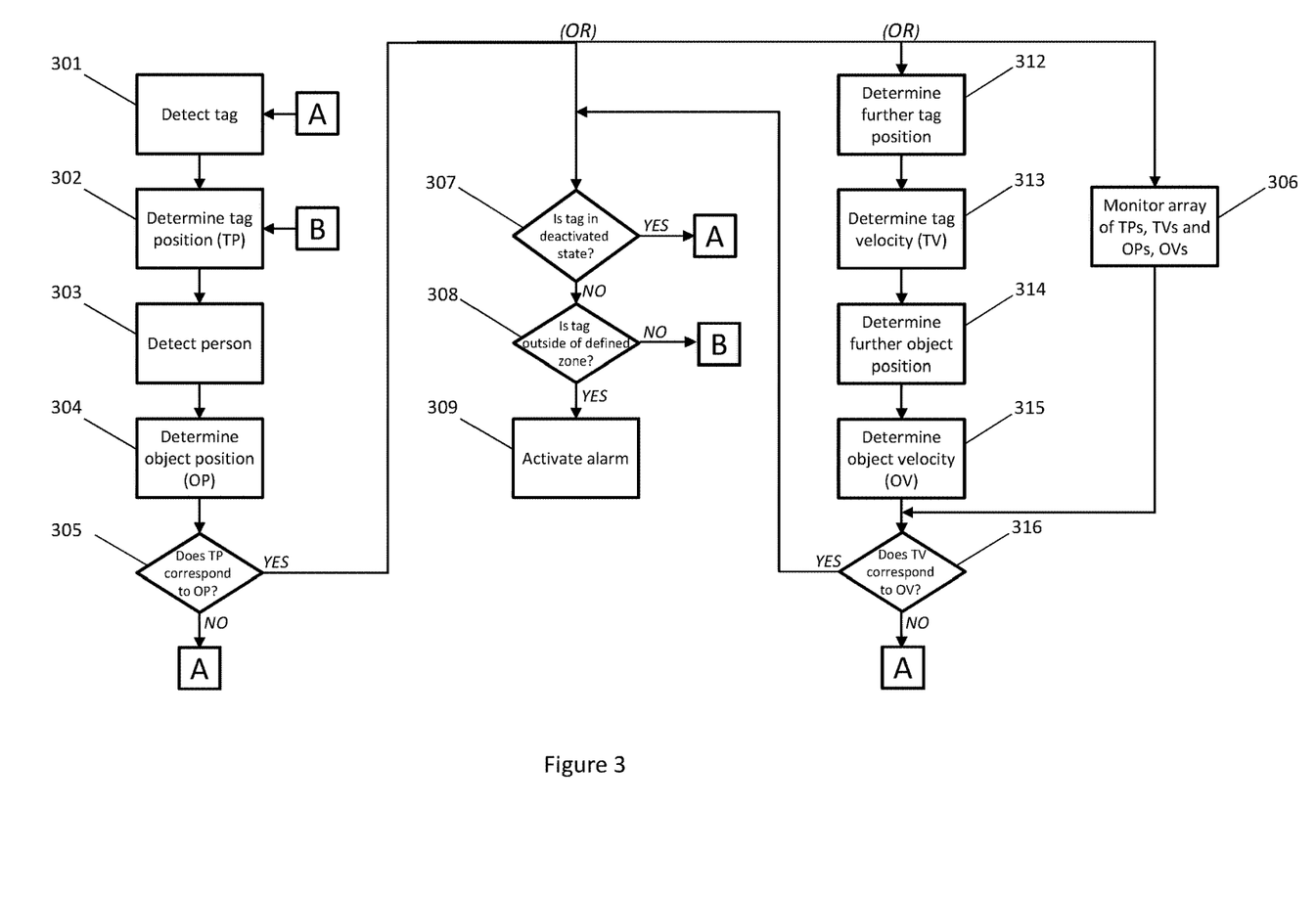
FIG. 3 shows a flow diagram representing a method for determining a revised position of a tag.

Referring to FIG. 3, there is shown a flow diagram representing various steps in a method for determining a revised position of the tag. Those skilled in the art will appreciate how this method may be used in relation to the monitoring devices and systems described in relation to FIG. 1 and FIG. 2. Though the method described in relation to FIG. 3 presents the steps in a particular order, it will be appreciated that in some embodiments, some steps may occur in a different order, or indeed, simultaneously. Furthermore, it will be appreciated that in some embodiments, some steps may be excluded altogether (ie some steps may be optional).

At step 301, a tag may be detected in the region of the RFID reader. The RFID reader may be configured to ignore tags persistently in the region of the RFID reader (for example, tags attached to articles on shelves within the region of the RFID reader).

At step 302, the processor determines the tag position, being the position of the tag. The processor determines the tag position based on a first set of data provided from the RFID reader. The way in which the processor determines position will depend on the configuration of the RFID reader and the data that it can sense related to position. For example, where the antenna of the RFID reader is able to scan in different directions, the first set of data may include data corresponding to the inclination and/or azimuth of the RFID tag with respect to the RFID reader. The first set of data may include data in respect of the strength of the signal from the RFID tag (from which the radius of the RFID tag relative to the RFID reader can be determined). The processor may then use coordinate transformation to determine the tag position relative to some reference origin (for example, the monitoring device itself).

In another embodiment, the processor may determine the tag position based on a first set of data from a first RFID reader and based on a further set of data from a further RFID reader (e.g. a reader in a further monitoring device). The data provided by the first RFID reader and/or further RFID reader may be used by the processor to triangulate the tag position and thus determine the tag position relative to some reference origin.

The tag position determined by the processor may be a range of tag position values, resulting in both an array of positions as well as a velocity and direction. As will be appreciated, the range of tag position values may be a three dimensional range of values. The range of tag position values may be defined by a sensed tag position (being the tag position sensed by the RFID reader(s) and determined by the processor) and a tag position uncertainty value. The tag position uncertainty value may be dependent on the known precision or accuracy of the processor to determine position based on data provided from the RFID reader and RFID tag system. It will be appreciated that the tag position uncertainty value may be sufficient such that the range of tag position values encompasses the actual tag position (as opposed to the sensed tag position).

At step 303, the processor may identify a person in the video data provided by the 3D video camera. In one embodiment, the 3D video camera 206a 206b may continuously calculate the position and velocity of a person, based on an overlay grid of coordinates and thus compare the image of the object to the grid and calculate the actual position, velocity and direction of the object or person. The second sensor 206a provides events, positions, velocity and direction information to the processors 207a 207b. Optionally, the 3D video camera may provide video data to the respective processor and the processor carries out the above calculations on the data provided.

Alternatively, the processor may instruct the 3D video camera to capture and provide video data in response to detecting a RFID tag at step 301. The processor may identify a person in the video data by recognising and isolating a person within a video image using suitable video analysis techniques.

At step 304, having identified a person in the video data, the processor receives data from the 3D video camera to determine whether the object position is the position of the person. The 3D video camera determines the object position based on an overlay grid of coordinates over the video images and thus comparing the image of the object to the grid and calculating the actual position, velocity and direction of the object or person. The way in which the processor determines the object position will depend on the configuration of the 3D video camera and the data that it can sense that is related to the position of objects captured in frame.

The object position determined by the processor may be a range of object position values, resulting in both an array of positions as well as a velocity and direction. As will be appreciated, the range of object position values may be a three dimensional range of values. The range of object position values may be defined by a sensed object position (being the object position sensed by the 3D video camera and determined by the processor) and an object position uncertainty value. The object position uncertainty value may be dependent on the known precision or accuracy of the processor to determine position based on data provided from 3D video camera. It will be appreciated that the object position uncertainty value may be sufficient such that the range of object position values encompasses the actual object position (as opposed to the sensed object position). In a preferred embodiment, the object uncertainty value may be smaller than the tag uncertainty value. That is to say, the processor is able to determine position more accurately or precisely based off data from the 3D video camera than from the RFID reader.

At step 305, the processor determines whether the array of tag positions, velocity and direction corresponds to the array of object positions, velocity and direction. In one embodiment, the processor may compare the range of tag positions, velocity and direction values and the range of object positions, velocity and direction values. If the range of tag positions, velocity and direction values coincides with the range of object positions, velocity and direction values to a sufficient degree, then the processor may determine that the tag positions, velocity and direction corresponds to the object positions, velocity and direction. Alternatively, if the sensed tag positions, velocity and direction is within the range of object positions, velocity and direction values, then the processor may determine that the tag positions, velocity and direction corresponds to the object positions, velocity and direction. Alternatively, if the sensed object positions, velocity and direction is within the range of tag positions, velocity and direction values, then the processor may determine that the tag positions, velocity and direction corresponds to the object positions, velocity and direction.

If the processor does not determine that the tag positions, velocity and direction corresponds to the object positions, velocity and direction, then it is presumed that the person identified in the video is not associated with the tag (and therefore the article to which the tag is attached). Accordingly, the method returns to step 301.

If the processor does determine that the tag positions, velocity and direction corresponds to the object positions, velocity and direction, then in a first embodiment the method may proceed to step 307, assuming that the person identified in the video is associated with the tag (and therefore the article to which it is attached).

At step 307, the processor may determine whether the tag is in a deactivated state. The processor may determine whether the tag is in a deactivated state based on data from the RFID reader. For example, the RFID tag itself may include information indicating that the tag is in a deactivated state and the RFID reader may provide this information to the processor such that the processor can determine that the tag is in a deactivated state. In another embodiment, the RFID tag may include information uniquely identifying the tag and the RFID reader may provide this information to the processor. The processor may determine that the particular tag is in a deactivated state by reference to information about the particular tag stored on the memory of the monitoring device and/or the server. As described previously, information on the monitoring device or the server may have been updated in response to the article to which the tag is attached being purchased.

If the tag is in a deactivated state, then the article to which the tag is attached may be presumed to have been purchased. Therefore, the article may be removed from the shop and no further steps are necessary. The method may return to step 301 to monitor for other tags.

If the tag is not in a deactivated state, then the article to which the tag is attached may not be presumed to have been purchased. Then at step 308, the processor may determine whether the revised tag position is outside a first defined zone. For example, the first defined zone may correspond to the area of the shop, and if the revised tag position is outside the first defined zone then it may be presumed that the article to which the tag is attached has been removed from the shop without being purchased.

In another embodiment, the processor may determine whether the tag position is inside a second defined zone. For example, the second defined zone may correspond to a restricted area in the shop, and if the revised tag position is inside the second defined zone then it may be presumed that the article to which the tag is attached has been taken into a restricted part of the shop.

Alternatively, step 308 may occur before step 307.

If the revised tag position is outside the first defined zone (or inside the second defined zone), then at step 309, the processor may identify an alarm state and/or may activate the alarm. This may include activating the light-emitting component and the noise-emitting component so as to bring attention to the removal of the article. Activating the alarm may further include providing a signal indicative of an alarm state. For example, the processor may generate an automated message (such as an email) and may transmit the message to the mobile device of an authorised user to notify the authorised user of the event. The method may then return to step 301.

If the revised position is not outside the first defined zone (or inside the second defined zone), then the method may return to step 302.

Returning to step 305, if the processor does determine that the tag position corresponds to the object position, then the method may proceed to step 312.

At step 312, after a predetermined time interval after step 302, the processor may determine a further tag position. The processor may be provided with further data from the RFID reader. Otherwise, the further tag position may be determined in much the same way as the tag position was determined at step 302.

At step 313, the processor determines a tag velocity. The processor may use the change in position of the tag from the tag position determined at step 302 to the further tag position determined at step 312 over the predetermined time interval to determine the tag velocity.

As will be appreciated, since the tag position and further tag position may comprise a range of tag position values and a range of further tag position values respectively, the tag velocity determined by the processor may comprise a range of tag velocity values. As will be appreciated, the range of object position values may be a four-dimensional range of values (i.e. direction in three-dimensions and magnitude). The range of tag velocity values may be defined by a determined tag velocity (being the tag velocity determined by the processor) and a tag velocity uncertainty value. The tag velocity uncertainty value may be dependent on the known precision or accuracy of the processor to determine velocity based on the tag position and further tag position.

At step 314, after the predetermined time interval after step 304, the processor may determine a further object position. The processor may be provided with further data from the 3D video camera. Other, the further object position may be determine in much the same way as the object position was determined at step 304.

At step 315, the processor determines an object velocity. The processor may use the change in position of the person from the object position determined at step 304 to the further object position determined at step 314 over the predetermined time interval to determine the object velocity.

Again, as will be appreciated, since the object position and further object position may comprise a range of object position values and a range of further object position values respectively, the object velocity determined by the processor may comprise a range of object velocity values. As will be appreciated, the range of object velocity values may be a four-dimensional range of values (i.e. direction in three-dimensions and magnitude). The range of object velocity values may be defined by a determined object velocity (being the object velocity determined by the processor) and an object velocity uncertainty value. The object velocity uncertainty value may be dependent on the known precision or accuracy of the processor to determine velocity based on the object position and further object position. In a preferred embodiment, the object velocity uncertainty value may be smaller than the tag velocity uncertainty value. That is to say, the processor is able to determine velocity more accurately or precisely based off object position than tag position.

At step 316, the processor determines whether the tag velocity corresponds to the object velocity. In one embodiment, the processor may compare the range of tag velocity values and the range of object velocity values. If the range of tag velocity values coincides with the range of object velocity values to a sufficient degree, then the processor may determine that the tag velocity corresponds to the object velocity. Alternatively, if the determined tag velocity is within the range of object velocity values, then the processor may determine that the tag velocity corresponds to the object velocity. Alternatively, if the determined object velocity is within the range of tag velocity values, then the processor may determine that the tag velocity corresponds to the object velocity.

If the processor does not determine that the tag velocity corresponds to the object velocity, then it is presumed that the person identified in the video is not associated with the tag (and therefore the article to which the tag is attached). Accordingly, the method returns to step 301.

If the processor does determine that the tag velocity corresponds to the object velocity, then it is presumed that the person identified in the video is associated with the tag (and therefore the article to which it is attached). Accordingly, the method may proceed to step 307, as described above.

The RFID reader of a monitoring device may scan for all tags in the manner of a radar, resulting in an updated position of all tags being reported back. For tags detected, three or more position coordinates are derived over time, which can be used to calculate an array of data for each tag on position, velocity and direction as explained herein. The predetermined time interval between reading one tag and a next tag may be approx. 0.002 seconds.

Alternatively, after step 305, if the processor determines that the tag position corresponds to the object position, the processor may continue to monitor the array of tag positions, velocity and direction in relation to the array of object positions, velocity and direction (step 306) to confirm that the tag corresponds with the object (if tag position corresponds to object position, tag velocity corresponds to object velocity and tag direction corresponds to object direction then it is assumed that the tag corresponds to the object) at step 316. The method then returns to either step 307 if the tag corresponds to the object, or step 301 if the tag does not correspond to the object.

In an alternative, steps 301*b* and 302*b* operate in the same manner as steps 301 and 302 except that more than one tag may be detected at the same moment in time to acquire data from a number of different tags within the vicinity of the RFID reader. At step 303*b*, the processor may determine whether the determined tag position(s) are within or outside a first defined zone. For example, the first defined zone may correspond to the area of the shop, and if the revised tag position is outside the first defined zone then it may be presumed that the article to which the tag is attached has been removed from the shop without being purchased.

At step 303*b*, the processor may identify one or more people in the video data provided by the 3D video camera. The 3D video camera may provide video data to the processor such that a position of the one or more people can be calculated at a certain time. At step 304*b*, the processor may determine whether each person identified is within or outside the first defined zone. At step 305*b* the processor may determine whether the tag position(s) and number of tags within or outside the first defined zone at a certain moment in time corresponds to the people position(s) and number of people within or outside the first defined zone at the same moment in time. If there is correspondence, alternate steps 307*b*, 308*b* and 309*b* may operate in the same manner as steps 307, 308 and 309 except that more than one tag and hence alarm may be considered. If there is no correspondence, the method may return to step 302.

The method may then return to step 301.

It will thus be appreciated that the method described in relation to FIG. 3, provides a means for the processor to determine whether the first parameter of the tag corresponds to the second parameter of the person. If they do correspond, then the processor may revise the tag position to that based on the position of the person. This results in a more precise and accurate determination of the tag position, thereby alleviating at least some of the problems associated with traditional approaches for EAS. Furthermore, determining the tag position more precisely and accurately enables the system to more accurately and precisely detect the removal of articles from the shop. Therefore, the monitoring device and system may be used to determine a revised position of tags, and therefore provide protection against unwanted article removal (i.e. theft protection). Similarly, the components within the monitoring device may be used to provide data regarding customer behaviour within the shop and inventory tracking. The revised tag position may further be used to track the movement of articles within the shop.

Also disclosed is a method of determining a revised position of a tag, comprising the steps of (a) determining a first parameter associated with the tag based on a first set of data from a first sensor, (b) determining a second parameter associated with an object based on a second set of data from a second sensor, (c) determining whether the first parameter corresponds to the second parameter, and (d) if the first parameter corresponds to the second parameter, determining the revised position of the tag based on the second set of data.

Optionally, the first set of data comprises the angle of the tag relative to a tag reader and/or the signal strength of a signal sensed by the tag reader. Optionally, the first parameter comprises data indicative of a position of the tag. Optionally, the step of determining the first parameter associated with the tag includes determining the tag position. Optionally, the first parameter comprises data indicative a velocity of the tag. Optionally, the step of determining the first parameter associated with the tag includes determining the tag velocity.

Optionally, the second sensor is arranged to capture at least one image of a region, wherein the object is within the region. Optionally, the second sensor comprises a counter based on Wifi whereby WiFi probe request signals are collected from smartphones or other WiFi devices. Optionally, the second parameter comprises data indicative of a position of the object.

Optionally, the step of determining the second parameter associated with the object includes determining the first object position. Optionally, the second parameter comprises data indicative of a velocity of the object.

Optionally, the step of determining the second parameter associated with the object includes determining the object velocity. Optionally, the step of determining whether the first parameter corresponds to the second parameter comprises determining whether the tag position corresponds to the object position. Optionally, the tag position may comprise a range of tag position values, and the range of tag position values are defined by a sensed tag position value and a tag position uncertainty value. Optionally, the object position comprises a range of object position values, and the range of object position values are defined by a sensed object position value and an object position uncertainty value. Optionally, the step of determining whether the tag position corresponds to the object position comprises determining whether the range of tag position values, at least partially, coincides with the range of object position values.

Optionally, the method further comprises determining whether the sensed tag position value is within the range of object position values or determining whether the sensed object position value is within the range of tag position values. Optionally, the first parameter comprises the tag velocity and preferably a direction of tag velocity. Optionally, the second parameter comprises the object velocity and preferably a direction of object velocity.

Optionally, the step of determining whether the first parameter corresponds to the second parameter further comprised determining whether the tag velocity and/or direction of tag velocity corresponds to the object velocity and/or direction of object velocity. Optionally, the tag velocity comprises a range of tag velocity values, and the range of tag velocity values are defined by a determined tag velocity value and a tag velocity uncertainty value. Optionally, the object velocity comprises a range of object velocity values, and the range of object velocity values are defined by a determined object velocity value and an object velocity uncertainty value.

Optionally, the step of determining whether the tag velocity corresponds to the object velocity comprises determining whether the range of tag velocity values, at least partially, coincides with the range of object velocity values. Optionally, the method further comprises determining whether the determined tag velocity value is within the range of the object velocity values or determining whether the determined object velocity value is within the range of tag velocity values. Optionally, the second set of data is more precise than the first set of data, wherein the object position uncertainty value may be smaller than the tag position uncertainty value and/or the object velocity uncertainty value may be smaller than the tag velocity uncertainty value.

Optionally, the method further includes the step of determining whether the revised position of the tag is at least one of outside a first defined zone and inside a second defined zone. Optionally, the method further comprises the step of, if the revised position of the tag is at least one of outside the first defined zone and inside the second defined zone, activating an alarm. Optionally, the method includes the step of determining whether the tag is in the deactivated state. Optionally, the method includes the further step of determining a further revised position of the tag by repeating steps (a) to (d) at a predetermined time interval after step (d). Optionally, the first sensor and second sensor are housed within a single housing.

Optionally, a plurality of units each comprise a housing, each unit housing at least one of one of a plurality of first sensors and one of a plurality of second sensors, wherein, the step of determining the first parameter may comprise determining the first parameter based on the first set of data from the first sensor and from a further first set of data from a further first sensor, and the step of determining the second parameter may comprise determining the second parameter based on the second set of data from the second sensor and from a further second set of data from a further second sensor.

Also disclosed is a monitoring device for determining a revised position of a tag, wherein the monitoring device comprises a first sensor configured to sense a first set of data, a second sensor configured to sense a second set of data, and a processor, wherein the processor is configured to determine a first parameter associated with the tag based on the first set of data, determine a second parameter associated with an object based on the second set of data, determine whether the first parameter corresponds to the second parameter, and if the first parameter corresponds to the second parameter, determine the revised position of the tag based on the second set of data.

Optionally, the monitoring device is further configured to carry out the method. Optionally, the processor is configured to count the number of people entering or leaving the defined zone. Optionally, the monitoring device comprises a memory to store data sensed by the first sensor and the second sensor. Optionally, the monitoring device is configured to communicate with a mobile device over a network or directly. Optionally, the monitoring device is configured to determine the position of the mobile device. Optionally, the monitoring device further includes an alarm. Optionally, the monitoring device comprises a single unit, comprising a single housing.

Also disclosed is a system comprising a plurality of monitoring devices.

Also disclosed is a computer-readable media comprising instructions executable by a processor to cause the monitoring device to carry out the method.

What is claimed is:

1. A method employing at least one processor executing computer executable instructions embodied on at least one non-transitory computer readable storage medium for determining a revised position of a tag, comprising the steps of:

(a) determining a first parameter associated with the tag based on a first set of data from a first sensor;
(b) determining a second parameter associated with a person based on a second set of data from a second sensor;
(c) determining whether the first parameter corresponds to the second parameter; and
(d) if the first parameter corresponds to the second parameter, determining the revised position of the tag based on the second set of data;
wherein the step of determining whether the first parameter corresponds to the second parameter further comprises determining whether one of a tag velocity corresponds to a person velocity or a direction of tag velocity corresponds to a direction of person velocity,
wherein the second set of data is more precise than the first set of data and a velocity uncertainty value of the person is smaller than a velocity uncertainty value of the tag, and
wherein, the step of determining the first parameter comprises determining the first parameter based on the first set of data from the first sensor and from a further first set of data from a further first sensor; and the step of determining the second parameter comprises determining the second parameter based on the second set of data from the second sensor and from a further second set of data from a further second sensor.

2. The method of claim 1 wherein the first set of data comprises the angle of the tag relative to a tag reader and/or the signal strength of a signal sensed by the tag reader.

3. The method of claim 1 wherein the second sensor is arranged to capture at least one image of a region, wherein the person is within the region.

4. The method of claim 1 wherein the second parameter comprises data indicative of a position of the person.

5. The method of claim 1 wherein the step of determining the second parameter associated with the person includes determining a first person position.

6. The method of claim 1 wherein the step of determining whether the first parameter corresponds to the second parameter comprises determining whether the tag position corresponds to the person position.

7. The method of claim 6 wherein the step of determining whether the tag position corresponds to the person position comprises determining whether a range of tag position values, at least partially, coincides with a range of person position values.

8. The method of claim 1 wherein the step of determining whether the tag velocity corresponds to the person velocity comprises determining whether the range of tag velocity values, at least partially, coincides with the range of person velocity values.

9. The method of claim 1 further including the step of determining whether the revised position of the tag is at least one of: outside a first defined zone and inside a second defined zone.

10. A monitoring device for determining a revised position of a tag, wherein the monitoring device comprises:
a first sensor configured to sense a first set of data;
a second sensor configured to sense a second set of data;
a further first sensor and a further second sensor; and
a processor, communicatively coupled to a non-transitory memory that stores computer-executable instructions, that executes or facilitates execution of the computer-executable instructions to:
determine a first parameter associated with the tag based on the first set of data;
determine a second parameter associated with a person based on the second set of data;
determine whether the first parameter corresponds to the second parameter; and
if the first parameter corresponds to the second parameter, determine the revised position of the tag based on the second set of data;
wherein the step of determining whether the first parameter corresponds to the second parameter further comprises determining whether one of a tag velocity corresponds to a person velocity and/or a direction of tag velocity corresponds to the person velocity and/or a direction of person velocity,
wherein the second set of data is more precise than the first set of data and a velocity uncertainty value of the person is smaller than a velocity uncertainty value of the tag, and
wherein, the step of determining the first parameter comprises determining the first parameter based on the first set of data from the first sensor and from a further first set of data from the further first sensor; and the step of determining the second parameter comprises determining the second parameter based on the second set of data from the second sensor and from the further second set of data from a further second sensor.

11. The monitoring device of claim 10 further including an alarm.

12. The monitoring device of claim 10 wherein the monitoring device comprises a single unit, comprising a single housing.

13. The monitoring device of claim 10, further comprising: the monitoring device is a component of a system including another monitoring device for determining a revised position of a tag, wherein the another monitoring device comprises:
a third sensor configured to sense a third set of data;
a fourth sensor configured to sense a fourth set of data; and
another processor; wherein
the another processor is configured to:
determine a third parameter associated with the tag based on the third set of data;
determine a fourth parameter associated with a person based on the fourth set of data;
determine whether the third parameter corresponds to the fourth parameter; and
if the third parameter corresponds to the fourth parameter, determine the revised position of the tag based on the fourth set of data.

* * * * *